3,270,022
QUATERNARY AMMONIUM SALTS
OF PYRROLE
Reginald L. Wakeman, Philadelphia, Pa., Edward Griffin Shay, Belle Mead, N.J., and Samuel Steinberger, Brooklyn, N.Y., assignors, by mesne assignments, to Millmaster Onyx Corporation, New York, N.Y., a corporation of New York
No Drawing. Filed June 29, 1964, Ser. No. 379,034
4 Claims. (Cl. 260—286)

The object of the present invention is the preparation of microbiologically active compounds by the reaction of certain quaternary ammonium hydroxides or their water-soluble salts with pyrrole or its alkali metal salts.

The products of this invention conform, in general, to the following structure:

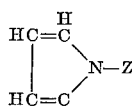

wherein Z is the cation of a microbiologically active quaternary ammonium compound.

Typical examples of the quaternary ammonium compounds which may be used in this invention are the alkyl trimethyl ammonium chlorides, alkyl-benzyl trimethyl ammonium chlorides, alkyl dimethyl benzyl ammonium chlorides, alkyl dimethyl menaphthyl ammonium chlorides, alkyl dimethyl substituted-benzyl ammonium chlorides in which the benzyl radical is substituted with one or more side chains containing from 1 to 5 carbon atoms such, for example, as methyl, dimethyl, ethyl and the like and in which the carbon atoms may all be in the same or different side chains or in which the benzyl radical bears one, two or more halogen atoms such as chlorine or bromine, alkyl pyridinium chlorides, alkyl isoquinolinium chlorides and bromides, alkyl lower-alkyl pyrrolidinium chlorides, alkyl lower-alkyl morpholinium chlorides in all of which the alkyl group may have from 8 to 22 carbon atoms and the lower-alkyl group may have from 1 to 4 carbon atoms and alkyl phenoxy ethoxy ethyl dimethyl benzyl ammonium chloride in which the alkyl radical may be iso-octyl or nonyl and in which the phenyl radical may, if desired, be substituted by a methyl radical. Various other analogs of these quaternaries may also be employed such, for example, as cetyl dimethyl ethyl ammonium bromide or oleyl dimethyl ethyl ammonium bromide.

In general, the quaternary ammonium compounds useful in this invention are the higher alkyl quaternary ammonium hydroxides, halides (chlorides and bromides), sulfates, methosulfates and the like possessing the following formula:

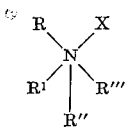

where R is an alkyl or alkaralkyl radical containing from 8 to 22 carbon atoms or an alkyl phenoxy ethoxy ethyl radical in which R is an alkyl radical containing from 8 to 9 carbon atoms and in which the phenyl radical may be substituted by a methyl group; R' and R" are methyl or ethyl radicals or members of a heterocyclic ring system such as pyridine, isoquinoline, pyrrolidine and morpholine; R''' is a methyl radical or a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof or a menaphthyl group or hydrogenated menaphthyl group. When R' and R" are members of a morpholine or pyrrolidine ring, R''' is a methyl, ethyl, propyl or butyl group. When R' and R" are members of an unsaturated heterocyclic ring such as pyridine or isoquinoline, R''' is the same radical as R". X in the above formula corresponds to a halide radical such as chloride, bromide or iodide or to any other water-soluble anion such as methosulfate.

In general, we prefer to use such quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," Ninth Edition (1960), pages 63 et seq.

The compounds of this invention may be prepared by mixing aqueous solutions of the quaternary ammonium salts or hydroxides with an aqueous or aqueous-alcohol solution of pyrrole or any of its water-soluble alkali metal salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, the removal of water may be essential for reasons not related to biological activity.

An alternative method for the preparation of compounds especially applicable to the treatment of fabric, ropes, net, woven and non-woven fabric and reticulated or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the cationic quaternary ammonium compound used in their preparation.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage,
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and non-ionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungistat for seed and soil treatment against damping-off.

The microbiological activity of our compounds is of the same order as that of the water-soluble quaternary ammonium hydroxides or salts from which they are prepared; in some cases it may be appreciably higher.

This invention is illustrated by, but not restricted to, the following examples:

*Example I*

A one-half molar stock solution of the potassium salt of pyrrole was prepared by dissolving pyrrole in the theoretical amount of an aqueous-alcohol solution of potassium hydroxide.

An aliquot of this solution containing 0.0362 molecular weight of the compound was agitated vigorously while adding a chemically equivalent amount of a 10% solution of a commercial grade of alkyl dimethyl ethyl-benzyl ammonium chloride (Onyx Chemical Corporation's "BTC-471" in which the alkyl distribution is 50% $C_{12}$, 30% $C_{14}$, 17% $C_{16}$, 3% $C_{18}$). A little benzene was added and the mixture separated into two phases. It was transferred to a separatory funnel and the organic product layer was removed and vacuum dried. The product, the alkyl dimethyl ethyl-benzyl ammonium salt of pyrrole, was recovered in the theoretical yield as a viscous brown liquid.

*Example II*

An aliquot of the solution of potassium salt of pyrrole of Example I containing 0.0362 molecular weight of the compound was reacted in the same manner as in Example I with a chemically equivalent amount of a 10% solution of a commercial grade of alkyl dimethyl benzyl ammonium chloride (Onyx Chemical Corporation's "BTC-824" in which the alkyl distribution is 60% $C_{14}$, 30% $C_{16}$, 5% $C_{12}$, 5% $C_{18}$). The separated and vacuum dried product, the alkyl dimethyl benzyl ammonium salt of pyrrole, was recovered as a light brown paste in the theoretical yield.

*Example III*

In the same manner, an aliquot of the potassium salt of pyrrole was reacted with a chemically equivalent amount of a 10% aqueous-alcohol solution of a commercial grade of alkyl isoquinolinium bromide (Onyx Chemical Corporation's "Isothan Q-75" in which the alkyl distribution is 50% $C_{12}$, 30% $C_{14}$, 17% $C_{16}$, 3% $C_{18}$). The benzene-containing organic product layer when vacuum dried yielded 91% of the theoretical amount of the alkyl isoquinolinium salt of pyrrole as a dark red viscous liquid.

We claim:

1. A quaternary ammonium compound having the structure:

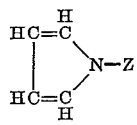

wherein Z is the cation derived from a quaternary ammonium compound of phenol coefficient of at least 100 with respect to both *Staphylococcus aureus* and *Salmonella typhosa* at 20° C. and having at least one alkyl of from 8 to 22 carbon atoms on the quaternary nitrogen.

2. Alkyl dimethyl ethyl-benzyl ammonium salt of pyrrole.

3. Alkyl dimethyl benzyl ammonium salt of pyrrole.

4. Alkyl isoquinolinium salt of pyrrole.

References Cited by the Examiner
UNITED STATES PATENTS 2,388,475   11/1945   Engel _____ 260—313 XR
2,492,414   12/1949   Chadwick _____ 260—313

OTHER REFERENCES

Schwartz et al.: "Surface Active Agents and Detergents, Vol. II," Interscience, 1958, pp. 218–19.

ALEX MAZEL, *Primary Examiner.*

NICHOLAS S. RIZZO, HENRY R. JILES, *Examiners.*

DONALD G. DAUS, *Assistant Examiner.*